(12) United States Patent
Smith

(10) Patent No.: US 6,195,219 B1
(45) Date of Patent: Feb. 27, 2001

(54) METHOD AND APPARATUS FOR IMPROVING A THERMAL RESPONSE OF A MAGNETORESISTIVE ELEMENT

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/175,814

(22) Filed: Oct. 20, 1998

(51) Int. Cl.$^7$ ................................ G11B 5/03; G11B 5/09
(52) U.S. Cl. ................................................. 360/66; 360/53
(58) Field of Search .................... 360/66, 25, 46, 360/53

(56) References Cited

U.S. PATENT DOCUMENTS

| | | | |
|---|---|---|---|
| 4,777,544 | 10/1988 | Brown et al. | 360/75 |
| 5,392,295 | 2/1995 | Coker et al. | 371/21.2 |
| 5,527,110 | 6/1996 | Abraham et al. | 374/5 |
| 5,739,972 | 4/1998 | Smith et al. | 360/77.03 |
| 5,748,415 | 5/1998 | Christner et al. | 360/113 |
| 5,751,510 | 5/1998 | Smith et al. | 360/67 |
| 5,880,899 | * 3/1999 | Blachek et al. | 360/66 |

OTHER PUBLICATIONS

Patent Application, Ser. No. 08/581,877, filed Jan. 2, 1996, entitled, "Method and Apparatus for Using a Thermal Response of a Magnetoresistive head".

Patent Application, Ser. No. 08/582,555, filed Jan. 2, 1996, entitled, "Method and Apparatus for Positioning a Dual Element Magnetoresistive Head".

Patent Application, Ser. No. 08/697,217, filed Aug. 21, 1996, entitled, "Method and Apparatus for Calibrating a Thermal Response of a Magnetoresistive Transducer".

Patent application, Ser. No. 08/810,154, filed Feb. 25, 1997, entitled, "Removal of Raised Irregularities on a Magnetic Disk with Controlled Abrasion by a Magnetoresistive Head".

Patent application, Ser. No. 08/914,662, filed Aug. 19, 1997, entitled, "Method and Apparatus for Calibrating a Thermal Response of a Magnetoresistive Element".

* cited by examiner

Primary Examiner—W. Chris Kim
(74) Attorney, Agent, or Firm—Matthew J. Bussan; James R. Nock

(57) ABSTRACT

A method and apparatus for improving a thermal response of a (magnetoresistive) MR element. In one embodiment, the thermal response is improved by reducing the heat transfer from the MR element to a shield layer. For example, an insulation layer between the MR element and the shield layer may be a material having a lower thermal conductivity than is conventional. In another embodiment, the thermal response is improved by controlling the heating of the MR element based on feedback signal from the MR element, for example, a thermal signal and/or a magnetic or thermal spacing signal. The controlled heating of the MR element may be provided by a heating element, a write element, and/or MR bias current, for example.

16 Claims, 12 Drawing Sheets

METHOD AND APPARATUS FOR IMPROVING A THERMAL RESPONSE OF A MAGNETORESISTIVE ELEMENT

BACKGROUND OF THE INVENTION

1. Technical Field

The present invention relates generally to information storage systems and, more particularly, to a method and apparatus for improving a thermal response of a magnetoresistive (MR) element employed in an information storage system.

2. Description of the Prior Art

A typical data storage system includes a magnetic medium for storing data in magnetic form and a transducer used to write and read magnetic data respectively to and from the medium A disk storage device, for example, includes one or more data storage disks coaxially mounted on a hub of a spindle motor. The spindle motor rotates the disks at speeds typically on the order of several thousand revolutions-per-minute. Digital information is typically stored in the form of magnetic transitions on a series of concentric, spaced tracks comprising the surface of the magnetizable rigid data storage disks. The tracks are generally divided into a plurality of sectors, with each sector comprising a number of information fields, including fields for storing data, and sector identification and synchronization information, for example.

The actuator assembly typically includes a plurality of outwardly extending arms with one or more transducers and slider bodies being mounted on flexible suspensions. A slider body is typically designed as an aerodynamic lifting body that lifts the transducer head off of the surface of the disk as the rate of spindle motor rotation increases, and causes the head to hover above the disk on an air-bearing produced by high speed disk rotation. The distance between the head and the disk surface, typically on the order of 50–100 nanometers (nm), is commonly referred to as head-to-disk spacing.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals, commonly referred to as readback signals, in the read element.

Conventional data storage systems generally employ a closed-loop servo control system for positioning the read/write (R/W) transducers to specified storage locations on the data storage disk. During normal data storage system operation, a servo transducer, generally mounted proximate the read/write transducers, or, alternatively, incorporated as the read element of the transducer, is typically employed to read information for the purpose of following a specified track (track following) and locating (seeking) specified track and data sector locations on the disk.

Within the data storage system manufacturing industry, much attention is presently being focused on the use of a magnetoresistive (MR) element as a read transducer. As is well appreciated by those skilled in the art, the MR element provides a number of advantages over conventional thin-film heads and the like.

Several techniques have been developed to convert the magnetic signal induced in an MR element to a spacing signal that varies as a function of head-to-disk spacing changes. For example, the magnetic spacing signal has been used in defect screening procedures in an effort to detect the presence of anomalous disk surface features. Such surface defects are typically associated with excessively large head-to-disk spacing changes or disk surface contact events.

In order to conduct a survey of a disk surface using a magnetic spacing signal approach, magnetic information must first be written to the disk surface from which the magnetic spacing signal is subsequently produced. It is appreciated by those skilled in the art that writing magnetic information to a disk surface for purposes of conducting defect screening is a time consuming and costly process. Further, it is known that a magnetic spacing signal incorrectly indicates the presence of certain surface features, such as magnetic voids, as variations in the topography of a disk surface.

Fortunately, several techniques have been developed to convert the thermal response of an MR element to a spacing signal that varies as a function of head-to-disk spacing changes. In order to conduct a survey of a disk surface using a thermal spacing signal approach, magnetic information need not first be written to the disk surface. As a result, the thermal spacing signal approach reduces the cost and time currently expended using the magnetic spacing signal approach. For example, U.S. Pat. No. 5,527,110 to Abraham et al., which is assigned to the assignee of the present invention, discloses a method and apparatus for mapping the character and location of small surface variations on a disk surface using thermal proximity imaging. Energy is supplied to an MR element in close proximity to the planar surface of the disk to thereby raise the temperature of the MR element. Energy is supplied in the form of bias current flowing through the MR element. A change in temperature of the MR element is detected when the MR element is in proximity to the variation to define the location and character of the variation.

U.S. Pat. No. 5,527,110 teaches that further heating, i.e., in addition to that provided by bias current, can be supplied with a resistor, and in fact may be desirable to bias the magnetic sensitivity to near zero. However, the inventor of the present invention has found that the amount of further heating necessary to achieve a desired level of thermal response varies significantly both among nominally identical MR elements and over time in the same MR element. Thus it is difficult, if not impossible, to choose a single amount of further heating to provide to multiple MR elements or even one MR element over its lifetime. Moreover, the inventor of the present invention has found that further heating may introduce a head/disk contact problem. More specifically, further heating of the MR element may cause the transducer head to distend toward the surface of the disk, which increases the likelihood of head/disk contact. Contact between the transducer head and the disk surface may result in wearing of the magnetic film provided on the disk surface, thereby producing a magnetic void at the abraded disk surface location.

There exists a keenly felt need in the data storage system manufacturing community for an apparatus and method for improving the thermal response of an MR element. There exists a further need to provide an apparatus and method for improving the thermal response of an MR element without the above-discussed problems introduced by further heating. The present invention is directed to these and other needs.

SUMMARY OF THE INVENTION

The present invention is an apparatus and method for improving a thermal response of a magnetoresistive (MR)

element. The thermal response is improved by controlling the heating of the MR element based on a feedback signal from the MR element, or by reducing the heat transfer from the MR element to a shield layer.

One aspect of the invention is a method of using a thermal signal for improving a thermal response of a magnetoresistive MR element spaced apart from a surface of a data storage disk. An information signal is read from a location on the disk surface and used to produce a thermal signal. The heating of the MR element is controlled based on the thermal signal. Preferably, the heat applied to the MR element is increased so long as the thermal signal increases in magnitude. Also, the heat applied to the MR element may be increased so long as the thermal signal indicates the flyheight of the MR element is greater than a minimum flyheight. On the other hand, the heat applied to the MR element may be decreased when the thermal signal indicates the MR element is contacting the data storage disk.

Another aspect of the invention is a method of using a thermal spacing signal and/or magnetic spacing signal for improving a thermal response of an MR element spaced apart from a surface of a data storage disk. An information signal is read from a location on the disk surface and used to produce a thermal spacing signal and a magnetic spacing signal. The heating of the MR element is controlled based on at least one of the thermal spacing signal and the magnetic spacing signal. Preferably, the heat applied to the MR element is increased so long as at least one of the thermal spacing signal and the magnetic spacing signal indicates the flyheight of the MR element is greater than a minimum flyheight. Also, the heat applied to the MR element may be increased so long as the thermal spacing signal increases in magnitude.

Yet another aspect of the invention is an apparatus for improving a thermal response of an MR element spaced apart from a surface of a data storage disk. The apparatus includes a heat source to heat the MR element, an arm electronics (AE) module to read an information signal from a location on the disk surface, a thermal signal extraction filter to produce a thermal signal using the information signal, and a controller to control the heat source based on the thermal signal. Preferably, the heat source is a bias current supplied to the MR element. The heat source may also be a thin-film write element adjacent to the MR element and/or heating element adjacent to the MR element.

Still another aspect of the invention is an MR bead that includes a shield layer, an insulation layer over the shield layer, and an MR element over the insulation layer. The thermal response of the MR element is improved by reducing the heat transfer from the MR element to the shield layer. Accordingly, the insulation layer has a thermal conductivity less or equal to 5 W/m-° C. Preferably, the insulation layer includes titania, barium titanate, and recrystallized glass ceramics.

Yet another aspect of the invention is a direct access storage device. The direct access storage device comprises a housing, at least one disk mounted in the housing for rotation about an axis, an MR head having an MR element, and an actuator operatively connected to the MR head for moving the MR element relative to a surface of the disk. The MR head includes a shield layer, an insulation layer over the shield layer, the insulation layer having a thermal conductivity less than or equal to 5 W/m-° C., and the MR element over the insulation layer. Preferably, the insulation layer includes titania, barium titanate, and recrystallized glass ceramics.

Other features and advantages of the present invention will become apparent from the following detailed description of the presently preferred embodiment of the invention, taken in conjunction with the accompanying drawings.

BRIEF DESCRIPTION OF THE DRAWINGS

The present invention will be described in greater detail with reference to the drawings. In the drawings like numerals refer to like elements.

DESCRIPTION OF THE PREFERRED EMBODIMENT

Overview

The present invention is a method and apparatus for improving a thermal response of a magnetoresistive (MR) element. In one embodiment of the invention, the thermal response is improved by reducing the heat transfer from the MR element to a shield layer. For example, an insulation layer between the MR element and the shield layer may be made of a material having a lower thermal conductivity than is conventional. In another embodiment of the invention, the thermal response is improved by controlling the heating of the MR element based on a feedback signal from the MR element, for example, a thermal signal and/or a magnetic or thermal spacing signal. The controlled heating of the MR element may be provided by a heating element, a write element, and/or MR bias current, for example.

Technical Background

The present invention may be advantageously employed to survey the surface topography of a data storage disk and to accurately and reliably detect disk surface features and defects, for example. The magnitude of a thermal spacing signal induced in an MR element is generally a function of head-to-disk spacing and the thermal response of the particular MR element used in the transducer assembly. The present invention improves the thermal response of the MR element, and consequently produces an improved thermal spacing signal which may be used to perform storage medium surface surveying and defect detection, for example. Preferably, head-to-disk spacing changes are detected in-situ, or within the housing of the data storage system, using the thermal response of the MR element. In-situ head-to-disk spacing measurement using the thermal response of the MR element is useful, for example, for purposes of disk manufacturing testing and screening, and for performing predictive failure analysis (PFA) during the service life of the data storage system in the field. While the invention is particularly suited for use with data storage disks, the invention is not limited thereto. Other types of storage mediums and their associated systems, such as tape drives, which employ MR elements are intended to be covered by the invention.

Figure 1:
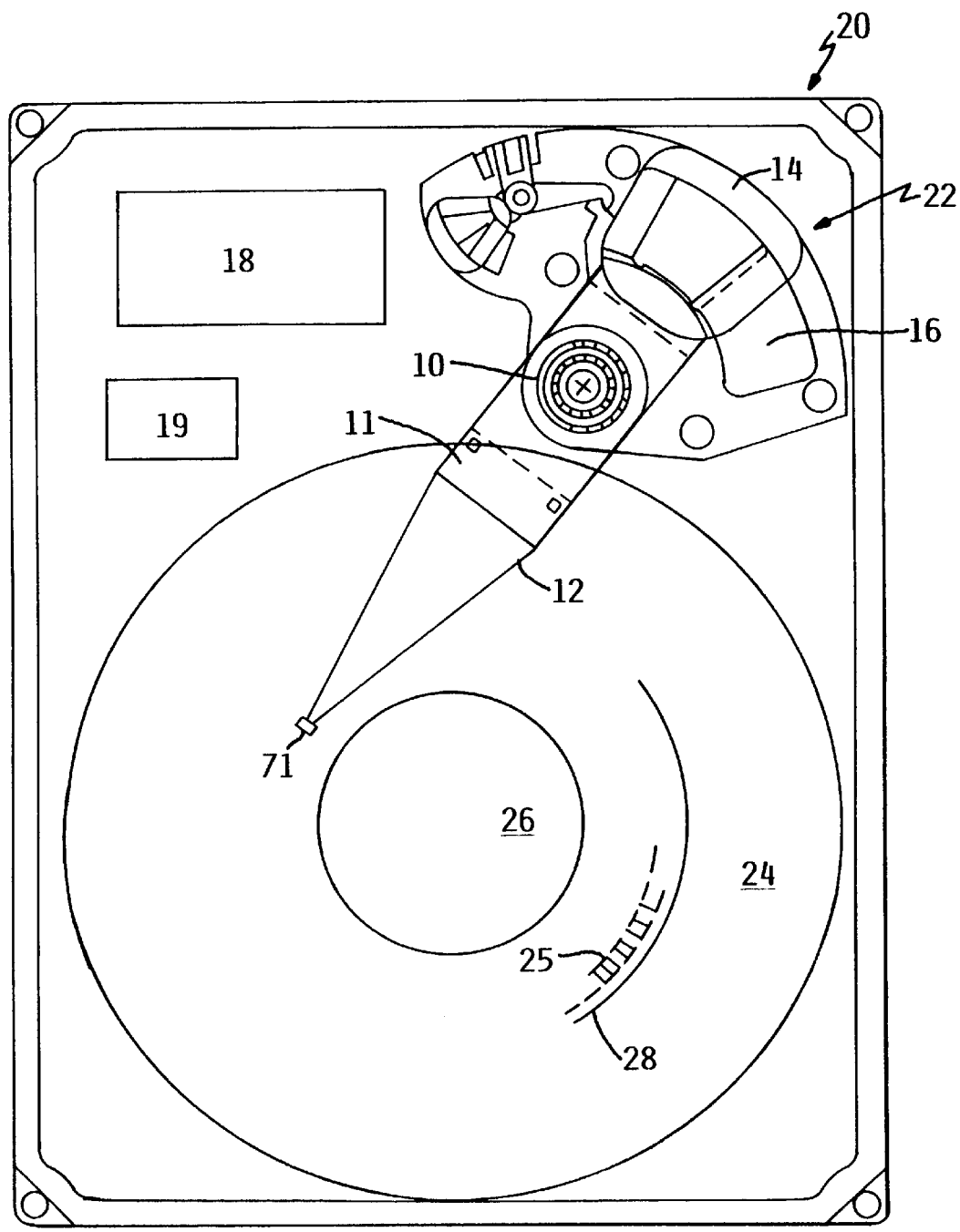
FIG. 1 is a top view of a data storage system with its upper housing removed.

Referring now to FIG. 1, there is illustrated an exemplary data storage system employing read/write (R/W) transducers 71 (only one is shown) having MR read elements. The data storage system 20 typically includes one or more rigid data storage disks 24 (only one is shown) which rotate about a spindle motor 26. An actuator assembly 10 typically includes a plurality of interleaved actuator arms 11 (only one is shown) and suspensions 12 (only one is shown), with each suspension supporting one or more R/W transducers 71 (each employing an MR read element) for reading and writing information respectively to and from the data storage disks 24.

The actuator assembly 10 includes a coil assembly 14 which cooperates with a permanent magnet assembly 16 to operate as an actuator voice coil motor 22 responsive to control signals produced by a servo controller 18, which typically includes, or is coupled to, a microprocessor. The servo controller 18 cooperates with the actuator voice coil motor 22 to move the actuator arms 11, suspensions 12 and R/W transducers 71 to prescribed track 28 and sector 25 locations when reading and writing data to and from the disks 24. The servo controller 18 is coupled to a disk drive controller 19 that also includes, or is coupled to, a microprocessor. The disk drive controller 19 typically includes control circuitry and software that coordinate the transfer of data to and from the data storage disks 24. Although the servo controller 18 and disk drive controller 19 are depicted in the figures as two separate devices, it is understood that the functionality of the servo processor 18 and disk drive controller 19 may be embodied in a single multi-purpose controller, which typically results in a reduced component cost. It should be appreciated that the above-described data storage system is provided by way of example, not limitation. As noted above, other information storage systems employing one or more MR elements to read information from a storage medium are intended to be covered by the invention.

Figure 2:
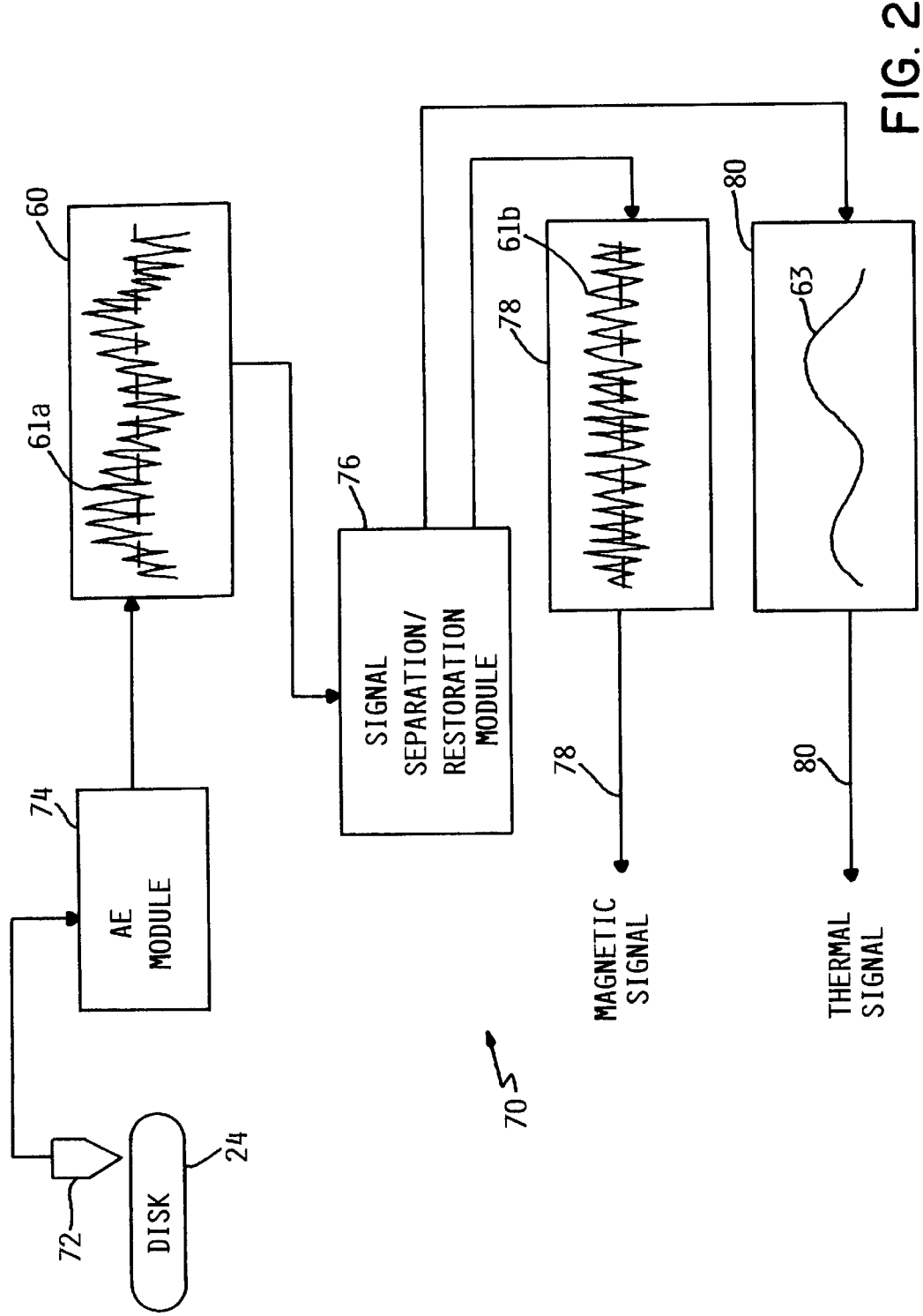
FIG. 2 is a block diagram of an apparatus for reading an information signal having a magnetic signal component and a thermal signal component from a magnetic storage medium and for separating the thermal and magnetic signal components from the information signal.

As mentioned above, several techniques are known by those skilled in the art to convert a thermal response of an MR element to a spacing signal that varies as a function of head-to-disk spacing changes. Examples of such techniques are described in U.S. Pat. No. 5,751,510 to Smith et al., which is assigned to the assignee of the present invention and incorporated herein by reference. FIG. 2 illustrates an exemplary apparatus 70 described in U.S. Pat. No. 5,751, 510 for reading an information signal having a magnetic signal component and a thermal signal component from a magnetic storage medium and for separating the thermal and magnetic signal components from the information signal. The information signal is processed to extract the thermal signal component from the information signal, and to remove the influence of the thermal signal component from the magnetic signal. The two independent magnetic and thermal signals extracted from the information signal may then be utilized individually or in combination to enhance the operation, performance, and reliability of the data storage system. In particular, a thermal spacing signal, which is developed from the thermal signal component of the MR element and is proportional to the head-to-disk spacing, may be produced and calibrated to accurately and reliably determine spacing changes between the MR element and the disk surface.

In FIG. 2, an MR element 72 is shown in close proximity with a surface of a data storage disk 24. The information read by the MR element 72 from the disk 24 is generally referred to herein as a readback or information signal. The readback signal produced in the MR element 72 is typically amplified by the arm electronics (AE) module 74. Filtering of the readback signal by the AE module 74 may also be performed. As shown in graphical form at the output of the AE module 74, the analog readback signal 60, which contains a relatively high frequency magnetic signal component 61a, exhibits a distorted D.C. baseline due to the presence of a low frequency modulating signal component.

The readback signal 60 is a composite signal comprising independent magnetic and thermal signal components. The low frequency modulation in the readback signal 60 is, in actuality, an independent thermal signal component of the readback signal 60. The thermal signal component of a readback signal 60 is referred to generally herein as a thermal signal, while the magnetic signal component of a readback signal 60 is referred to generally herein as a magnetic signal. A signal separation/restoration module 76, as discussed hereinbelow, extracts the magnetic signal 78 and the thermal signal 80 from the readback signal 60. As shown in graphical form at the outputs of signal separation/restoration module 76, the magnetic signal 78 (denoted as 61b in the graph) has a relatively high frequency and exhibits a restored baseline, while the thermal signal 80 (denoted as 63 in the graph) has a relatively low frequency. Importantly, the thermal signal 78 includes informational content which may be utilized for a variety of advantageous purposes, including, for example, determining any change in the flyheight of the MR element 72 with respect to a disk surface 24 to an accuracy on the order of 1 nanometer, disk surface analysis and topographical mapping, glide testing including disk defect detection and screening, error correction, predictive failure analysis (PFA), and servo control.

Figure 2A:
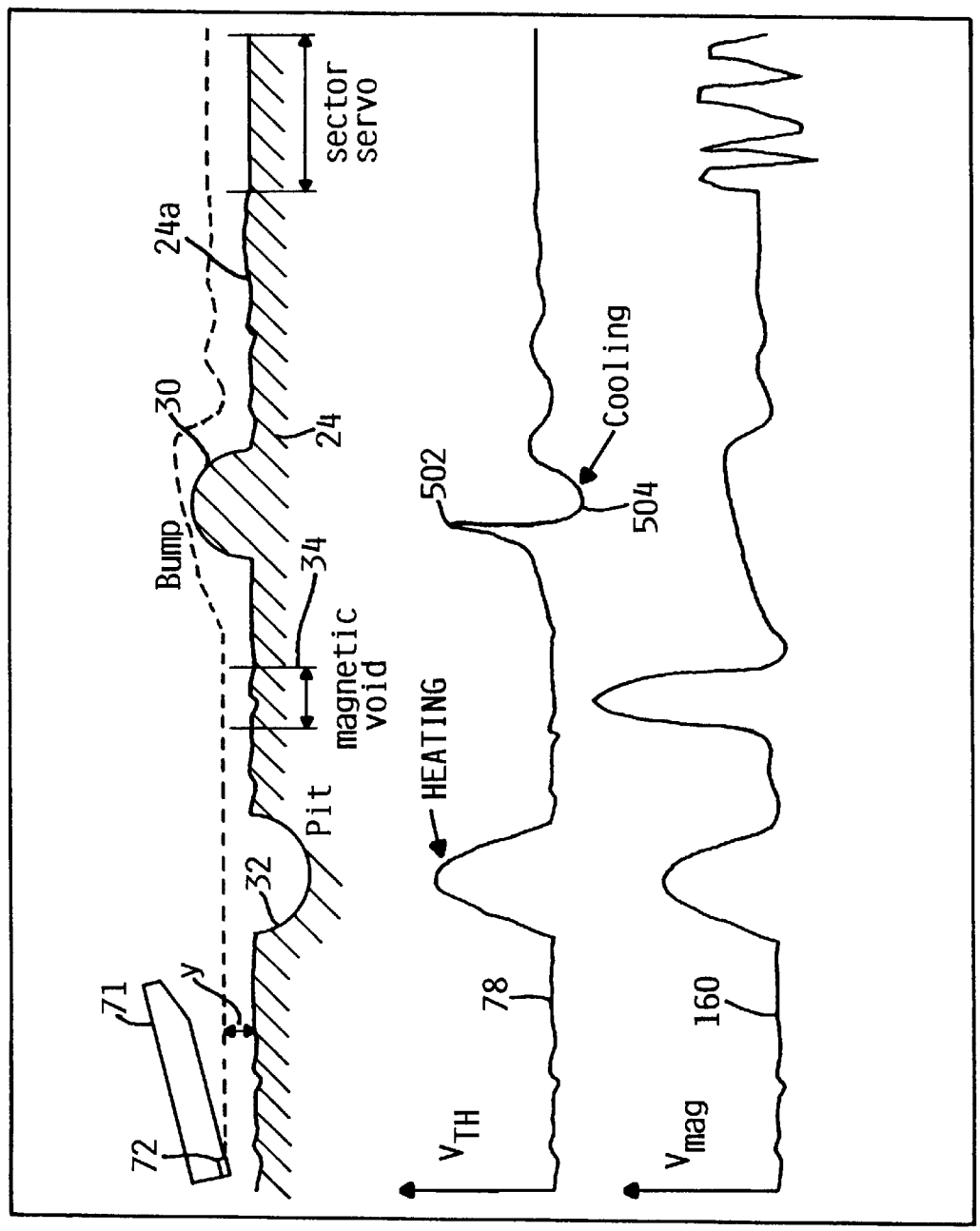
FIG. 2A is an exaggerated side view showing a data storage disk exhibiting various surface features, and a thermal response and a magnetic response of an MR element to such features.

As is shown in FIG. 2A, the thermal response voltage level 78 of the MR element 72 changes as a function of the spacing, denoted by parameter (y), between the MR element 72 and the disk surface 24a. Changes in the magnetic readback signal result from changes in the resistance of the MR element 72. More particularly, a typical MR element, which is a resistor that is sensitive to the presence of magnetic fields, is electrically coupled to a current source between positive and negative element leads. A bias current is applied to the MR element 72 via the leads (not shown). In normal operation, magnetic fields created by magnetic transitions on the disk surface 24a affect the resistance of the MR element 72 giving rise to voltage variations across the MR element 72. These voltages occur at the frequency of the magnetic data transitions recorded on the disk surface 24*a* and are the basis for the magnetic signal component of the readback signal.

The resistance of the MR element 72 is also effected by the head-to-disk spacing. More particularly, head-to-disk spacing changes result in concomitant changes in heat transfer from the MR element 72, which is heated by the bias current, to the disk 24. The heat transfer is an inverse function of the head-to-disk spacing. If the heat transfer from the MR element 72 is increased (small spacing), then the temperature of the MR element 72 and its resistance will decrease. The temperature and the resistance of the MR element 72 will increase (larger spacing) if the heat transfer is reduced. Thus, changes in the heat transfer between the MR element 72 and the disk 24 results in an alteration of the temperature of the MR element 72.

Temperature changes in the MR element 72 result in corresponding changes in the electrical resistance of the MR element 72 and, therefore, the voltage across the MR element 72 being supplied by a constant bias current. It is noted that variations in slider flyheight typically occur at a frequency significantly lower than that of the magnetic transitions. Therefore, such temperature changes in the MR element 72 occur at a frequency significantly lower than the magnetic data transitions and are the basis of the thermal component of the readback signal.

As FIG. 2A further illustrates, there is an inverse relationship between the topographical surface variations of the disk 24 and the changes in magnitude of the thermal voltage signal 78. As the instantaneous bead-to-disk spacing (y) increases, there results a corresponding increase in air space insulation between the MR element 72 and the disk surface 24*a*, thereby causing an increase in the temperature in the MR element 72. This temperature increase in the MR element results in a corresponding increase in the MR element 72 resistance due to the positive temperature coefficient of the MR element material typically used to fabricate the MR element 72. Permalloy, for example, is a preferred material used to fabricate the MR element 72 and demonstrates a temperature coefficient of +3×10$^{-3}$/° C. An MR element 72 passing over a bump 30 on the disk surface 24*a*, by way of example, results in increased heat transfer occurring between the MR element 72 and the disk surface 24*a*, thereby causing cooling of the MR element 72. Such cooling of the MR element 72 causes a decrease in the MR element resistance which, in turn, results in a corresponding decrease in the voltage $v_{TH}$ across the MR element 72 at a constant bias current.

As a result of the above-described interaction between the MR element 72 and the disk surface 24*a*, it can be seen by referring to a pit 32 depicted on the disk surface 24*a* that the thermal voltage signal $v_{TH}$ 78 across the MR element 72 increases in amplitude as a function of increasing head-to-disk separation distance (y). For purposes of convenience, it may be desirable to invert the thermal voltage signal $v_{TH}$ 78 so that changes in disk surface 24*a* topography correspond directly, rather than inversely, to changes in the thermal voltage signal $v_{TH}$, 78. Thus, the negative value of the MR transducer voltage, $-v_{TH}$, will provide a qualitative indication of the disk surface 24*a* topography by indicating "cooling areas" as peaks and "heating areas" as valleys. The discussion herein will be based on the assumption that the transducer voltage is not inverted.

Also shown in FIG. 2A is a magnetic spacing signal 160 ($V_{mag}$) which has been conditioned to correspond to variations in the disk surface 24*a* as discussed hereinbelow with respect to FIG. 4. It can be seen that the magnetic spacing signal 160 incorrectly indicates the presence of some surface features, such as magnetic voids 34, as variations in the topography of the disk surface 24*a*. It can further be seen that the magnetic spacing signal 160 provides an inferior indication of other surface features, such as bumps 30, when compared to disk surface imaging information provided by use of the thermal signal 78.

Another characteristic of an MR element 72 that influences the nature of the readback signal obtained from the disk surface concerns a situation whereby the MR element 72 comes into physical contact with the disk surface or other obstruction. A thermal asperity, for example, occurs when a temporary physical contact occurs between the disk surface and the MR element 72. Such contact causes an initial positive (heating) peak 502 of the thermal voltage response followed in rapid succession by a negative (cooling) peak 504. The positive response is caused by mechanical frictional heating between the MR element 72 and a local asperity such as bump 30 on the disk surface 24*a*. The mechanical friction associated with a thermal asperity can scrape off the magnetic coating in the area of physical contact and is one of a number of sources of magnetic voids. The positive response peak 502 and the negative response peak 504 may be used to detect disk surface contact.

Figures 1, 3:
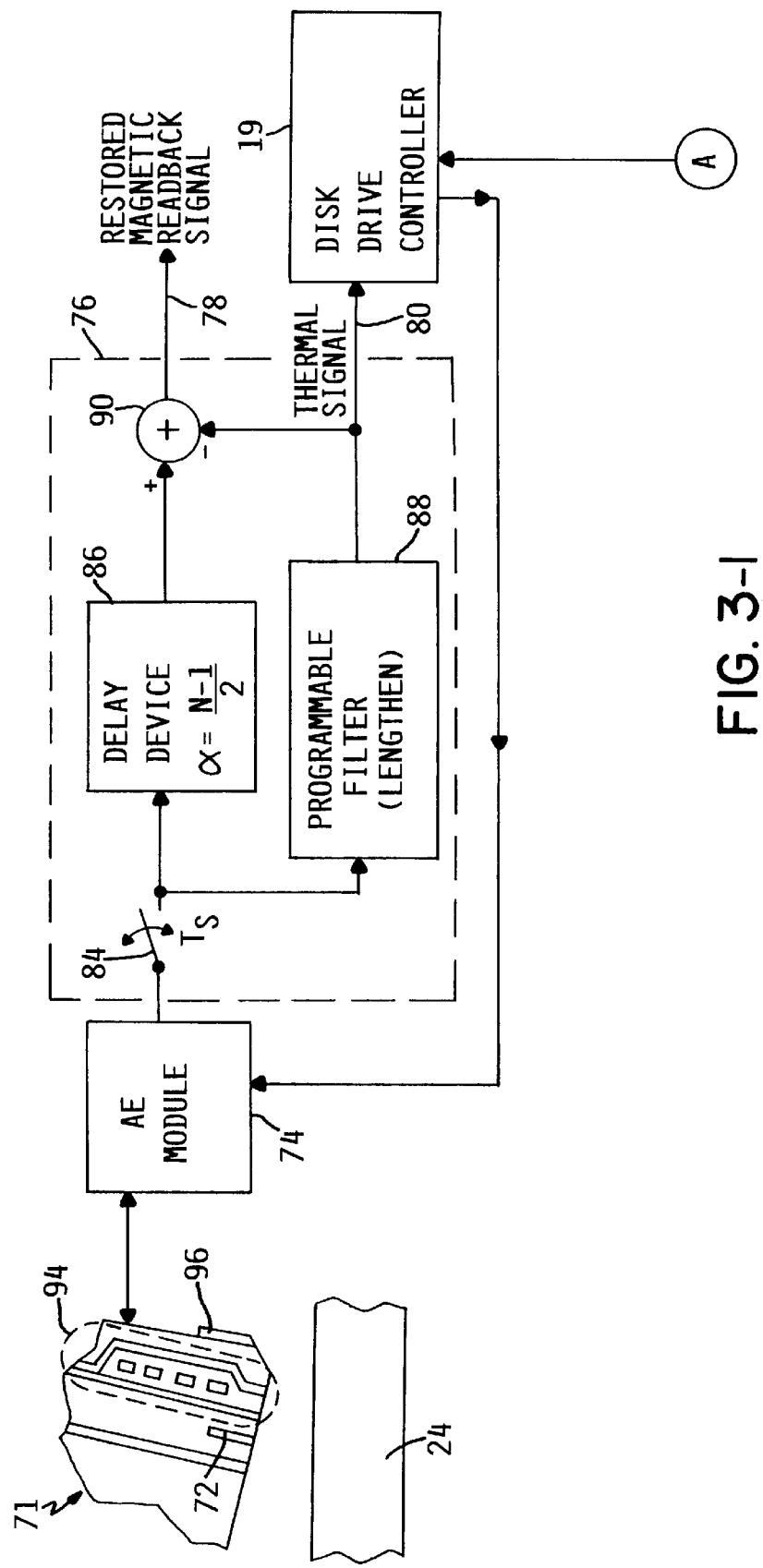
FIG. 3 shows an embodiment of an apparatus for improving the thermal response of an MR element according to the present invention.
Figures 2, 3:
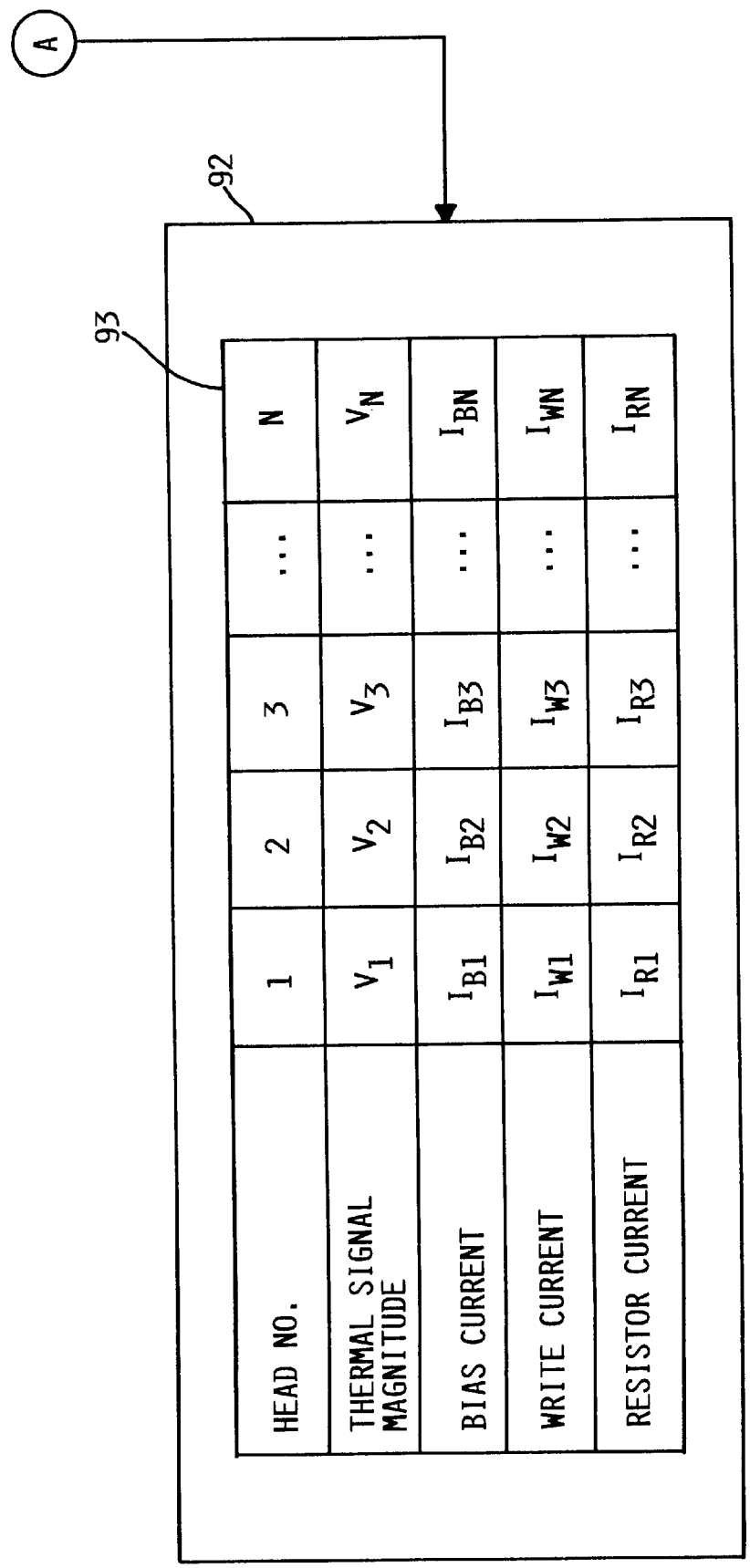

FIG. 3 shows an embodiment of an apparatus for improving the thermal response of an MR element according to the present invention. Illustrated in FIG. 3 is an exemplary signal separation restoration module 76 discussed previously with respect to FIG. 2. The particular technique used to convert the readback signal to a thermal signal is not important for purposes of the invention. For example, as shown in FIG. 3 the signal separation/restoration module 76 may be employed to perform the dual tasks of separating the magnetic signal component from the readback signal 60 to remove the low frequency thermal signal component, and, in addition, extracting the thermal signal from the readback signal 60, thus making available for subsequent processing the informational content of both the magnetic signal and thermal signal in substantially independent form. Alternatively, a thermal signal extraction filter may be employed to perform the single task extracting the thermal signal from the readback signal thus making available for subsequent processing the information content of the thermal signal.

Each R/W transducer 71 typically includes the MR element 72 and a thin-film write element 94. In addition, each R/W transducer 71 may include a heating element 96 described hereinbelow. The MR element 72, the thin-film write element 94 and the heating element 96 are coupled to the AE module 74. For the sake of clarity, only one overall electrical connection is shown between AE module 74 and R/W transducer 71. This overall electrical connection represents all of the electrical connections between the various subcomponents of the R/W transducer 71 and the AE module 74.

The AE module 74 includes a write current driver (not shown), which is coupled to the thin-film write element 94 by an electrical connection and provides a write current to the thin-film write element 94. As is well known in the art, write source data comes into the write current driver from a data channel (not shown). As is also well known in the art, the data channel and the write current driver are managed by the disk drive controller 19. The AE module 74 also includes a bias current control unit (not shown) and a preamplifier (not shown), both coupled to the MR element 72 by an electrical connection. As is well known in the art, the bias current control unit supplies a bias current to the MR element 72 when reading from the disk 24. As is also well known in the art, the bias current control unit is managed by disk drive controller 19.

In addition, the AE module 74 may include a heating subcomponent, e.g., a resistor current driver (not shown), coupled to heating element 96 of the R/W transducer 71 by an electrical connection. In this case, the resistor current driver supplies a resistor current to the resistor heating element 96. The resistor current driver is managed by disk drive controller 19.

A readback signal received by the preamplifier of the AE module 74 from the MR element 72 is converted from analog form to digital form by an analog-to-digital converter 84. Alteratively, the AE module 74 may be a digital device incorporating an analog-to-digital converter. In accordance with a digital version of the AE module 74, use of a linear phase programmable filter can result in little to no phase or amplitude degradation in the thermal signal component of the readback signal.

The digitized readback signal is then communicated to a delay device 86 and to a linear phase programmable filter 88. Preferably, the programmable filter 88 is a finite impulse response (FIR) filter having a length N, where N represents the number of impulse response coefficients or taps of the programmable filter 88. The readback signal applied to the input of the programmable filter 88 is subject to a total signal delay corresponding to the length N of the programmable filter 88 as the readback signal passes through the programmable filter 88.

The programmable filter 88 is programmed with appropriate tap coefficients and weights so as to pass the relatively low frequency thermal signal component of the readback signal and to filter out the relatively high frequency magnetic signal component. As such, the programmable filter 88 is configured as a lowpass filter and programmed to pass the thermal signal content which can be generally characterized as a medium frequency signal with much of its energy in the frequency range of approximately 10 kilohertz (KHz) to approximately 100–200 KHz. It is noted that the magnetic signal component of the readback signal has a frequency ranging between approximately 20 megahertz (MHz) and 100 MHz. The thermal signal 80 at the output of the programmable filter 88 is communicated to a signal summing device 90. From the output of the programmable filter 88, the thermal signal 80 may be transmitted to other components in the data storage system, such as to the disk drive controller 19 discussed hereinbelow for purposes of controlling the heating of the MR element 72.

The delay device 86 receives the readback signal from the analog-to-digital converter 84 and delays the transmission of the readback signal to the signal summing device 90 by a duration of time equivalent to the delay time required for the readback signal to pass through the programmable filter 88. As such, the readback signal, containing both magnetic and thermal signal components, and the thermal signal 80, extracted from the readback signal by the programmable filter 88, arrive at the signal summing device 90 at substantially the same time. The signal summing device 90 performs a demodulation operation on the readback signal and thermal signal 80 to produce a restored magnetic readback signal 78. Thus, the signal separation/restoration module 76 illustrated in FIG. 3 provides for the separation of the magnetic and thermal signal components of a composite readback signal and, additionally, produces a non-distorted restored magnetic readback signal 78 and a restored thermal signal 80.

The embodiment shown in FIG. 3 further includes a memory 92 coupled to the disk drive controller 19. The memory 92, although depicted as a component separate from the disk drive controller 19, may be provided within the disk drive controller 19. The memory 92 may be configured to include a table or array 93 within which thermal signal parameters and MR heating parameters associated with each of the R/W transducers 71 may be stored. For example, thermal signal parameters such as thermal signal magnitude, e.g., the peak MR output voltage (negative or positive), for each of the MR elements 72 installed in a disk drive may be stored in memory 92. Of course other thermal signal parameters may be stored in memory 92 and used instead of, or in addition to, the peak MR output voltage. Such thermal signal parameters include the standard deviation of the thermal signal and the range of maximum negative to maximum positive of the thermal signal. Examples of MR heating parameters that may be stored in memory 92 include bias current or voltage to the MR element 72, write current or voltage to the thin-film write element 94, and a measure of energy to the heating element 96 such as resistor current to a resistor.

As mentioned above, the R/W transducer 71 may include heating element 96, which is selectively activated and controlled by disk drive controller 19 in order to heat the MR element 72. The heating element may comprise, for example, a carbon film resistive material such as a thin film resistor, surface mount resistor or nichrome wire coil to heat the MR element 72. Alteratively, the heating element 96 may comprise another heat generating means employing electrical, mechanical, chemical, or other suitable heat generating components and techniques.

Thin-film write element 94 is positioned on the R/W transducer 71 adjacent to MR element 72. Thus, when write current is supplied to thin-film write element 94, the heat generated therein is transferred to the MR element 72. Similarly, the heating element 96 is positioned on the R/W transducer 71 adjacent to MR element 72. Thus, for example, when resistor current is supplied to resistor heat element 96, heat generated therein is transferred to the MR element 72.

Disk drive controller 19 controls the heating of MR element 72 based on the thermal signal parameter. For example, disk drive controller 19 monitors the magnitude of thermal signal 80 for each MR element 72 as that MR element 72 flies over a predetermined area, e.g., the inside diameter (ID), the outside diameter (OD), or a track, of disk 24. The peak MR output voltage may be the peak voltage measured as the MR element 72 flies over the predetermined area of the disk 24 during a single revolution of the disk 24 (or portion thereof), or during multiple revolutions of the disk 24. The peak MR output may also be the average or mean of several such measured peak voltages. The peak MR output voltage is stored in memory 92, along with at least one of the MR beating parameters. One or more of the MR heating parameters is then increased in steps within a predetermined range so long as the thermal signal increases in magnitude. That is, the step-wise increase in the MR heating parameter is ceased when the thermal response of MR element 72 starts to drop or a maximum MR heating parameter value within the predetermined range is reached. Rather than waiting for the thermal response to start to drop, it may be desirable to stop the step-wise increase in the MR heating parameter when the thermal response of MR element 72 has increased to a desired level. Alternatively, it may be desirable to decrease, rather than increase, one or more of the MR heating parameters. In any case, because the thermal response of each MR element can be improved independently, the present invention can overcome the problem of choosing a single amount of heating to provide to multiple MR elements. Likewise, because the thermal response of an MR element can be improved periodically, the present invention can overcome the problem of choosing a single amount of heating to provide to the MR element over its lifetime.

Figure 3A:
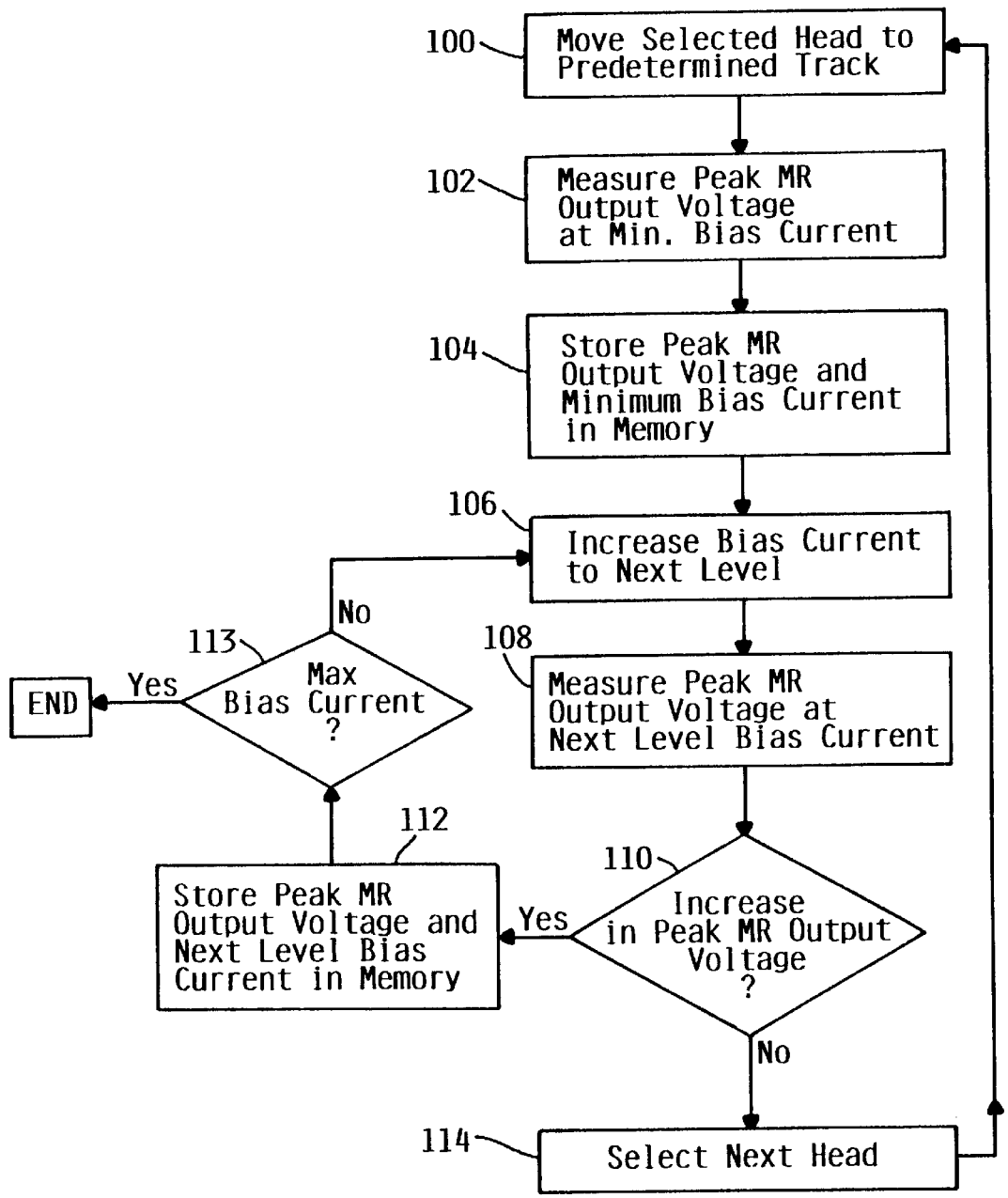
FIG. 3A is a flowchart of an embodiment of a method for improving the thermal response of an MR element according to the present invention using the apparatus shown in FIG. 3.

FIG. 3A is a flowchart of an exemplary method of using the apparatus shown in FIG. 3. In FIG. 3A, the bias current is used as the MR heating parameter. However, any combination of bias current or voltage, write current or voltage, and resistor current or voltage (or other measure of energy to the heating element 96) may be used. The method begins at step 100, with the movement of a selected MR element 72 to a predetermined track on disk 24. As is well known in the art, this may be accomplished by servo controller 18 in cooperation with actuator voice coil motor 22, for example. At step 102, the disk drive controller 19 measures the peak MR output voltage (thermal signal magnitude) at a minimum bias current within a predetermined range of bias current. For example, the low end of the predetermined range may be the bias current normally supplied to the MR element 72 when reading data that is magnetically stored on disk 24, while the high end may of the predetermined range may be the maximum bias current that will not damage the MR element 72. At step 104, the peak MR output voltage and the minimum bias current are stored in memory 92. At step 106, the disk drive controller 19 increases the bias current to a next level within the predetermined range. At step 108, the disk drive controller 19 measures the peak MR output voltage (thermal signal magnitude) at the next level bias current. At step 110, the disk drive controller 19 determines whether the peak MR output voltage at the next level bias current is larger than the peak MR output voltage in memory 92. If the peak MR output voltage has increased, the peak MR output voltage and the next level bias current are stored in memory 92 at step 112. At step 113, the disk drive controller 19 determines whether the next level bias current is the maximum bias current within the predetermined range. If the next level bias current is the maximum bias current, the process ends. If the next bias current is not the maximum bias current, the process returns to step 106. If the peak MR output voltage has decreased at step 110, the next MR element 72 is selected at step 114, and the process returns to step 100. Of course, step 114 and the subsequent return to step 100 are unnecessary if the data storage system only employs one MR element 72.

Alternatively, if write current or resistor current are used as the MR heating parameter, the process begins with the write current or resistor current at the low end (or high end) of their predetermined range. The predetermined range for the write current, for example, may be from zero to the maximum write current that will not damage either the write element 92 or the MR element 72. Similarly, the predetermined range for the resistor current, for example, may be from zero to the maximum resistor current the will not damage either the resistor heating element 96 or the MR element 72. If the write current is used as the MR heating parameter, the process must be used before servo writing or in single disk testing, for example, where erasing the media is not a problem. Table 1 below shows the peak MR output voltage (thermal signal magnitude) versus write current in an example data storage system where write current was used as the MR heating parameter.

TABLE 1

| Write Current (milliamps) | Peak MR Output Voltage (Thermal Signal Magnitude) (millivolts) |
| --- | --- |
| 0 | 3 |
| 50 | 6 |
| 75 | 14 |
| 100 | 19 |
| 115 | 25 |

Heating the MR element 72 causes the R/W transducer 71 to expand and thus distend toward the surface of the disk 24, thereby increasing the likelihood of head/disk contact. Contact between the R/W transducer 71 and the surface of disk 24 may result in wearing of the magnetic film provided on the disk surface, thereby producing a magnetic void at the abraded disk surface location. Therefore, as discussed in the next embodiment, it may be desirable to control the heating of MR element 72 based on the head-to-disk spacing instead of, or in addition to, the thermal signal parameters discussed hereinabove. The head-to-disk spacing may be monitored using the magnetic signal or the thermal signal.

Figures 1, 4:
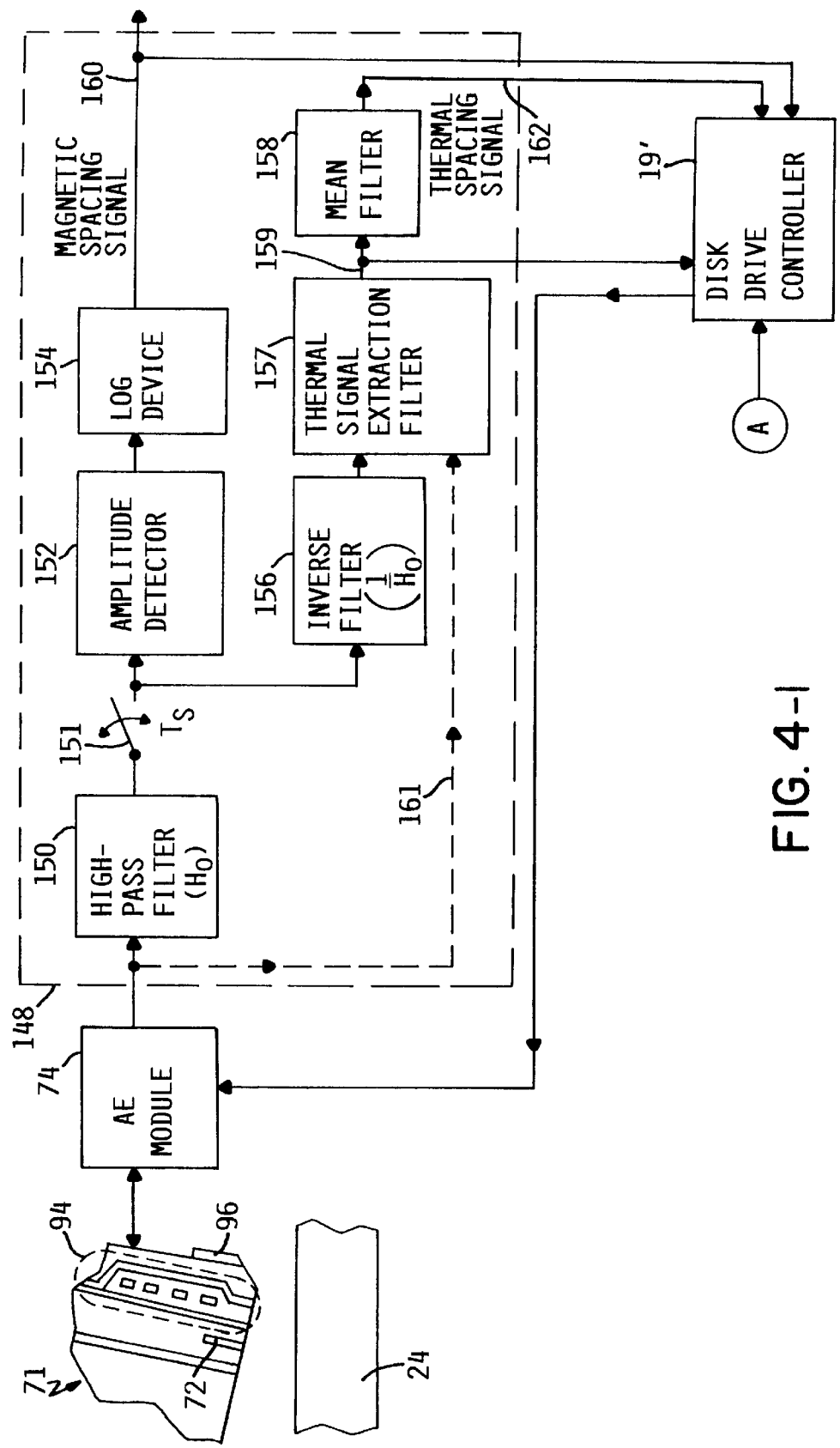
FIG. 4 shows another embodiment of an apparatus for improving the thermal response of an MR element according to the present invention.
Figures 2, 4:
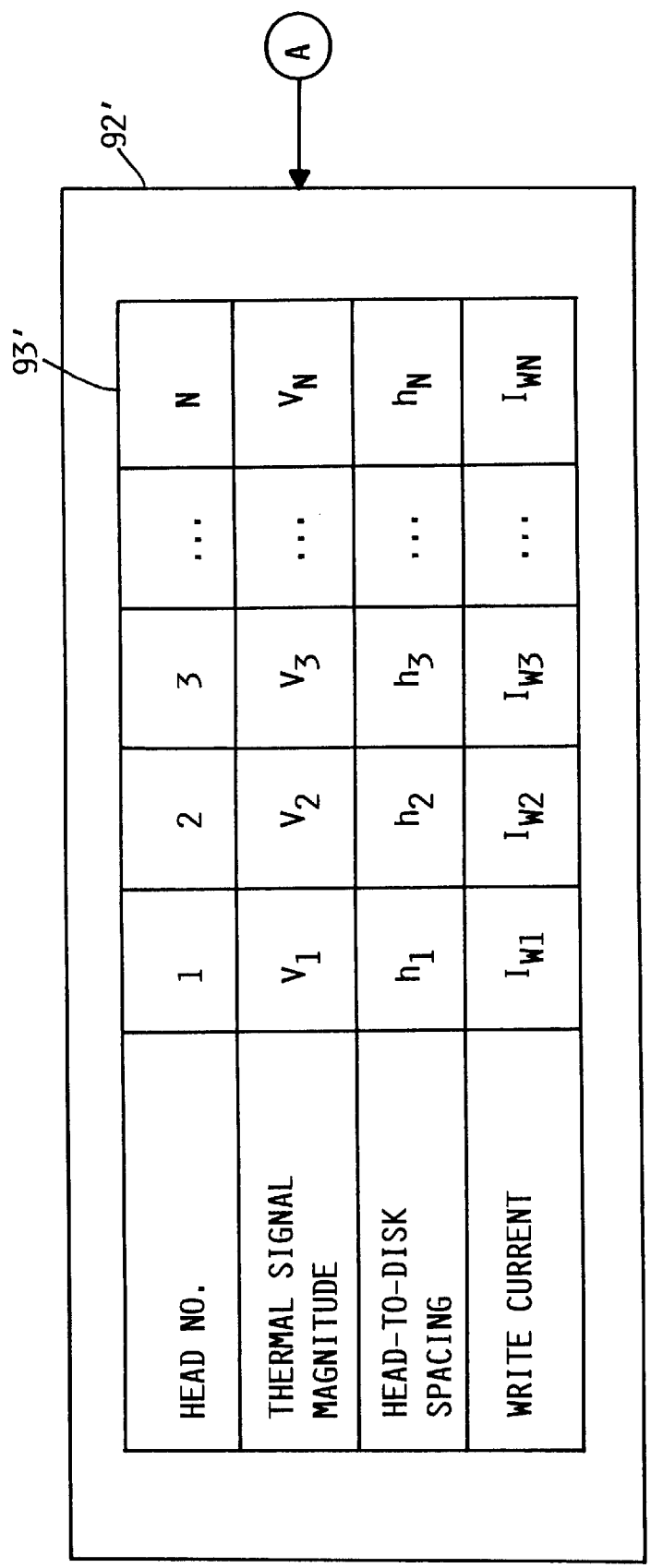

FIG. 4 shows another embodiment of an apparatus for improving the thermal response of an MR element according to the present invention. Illustrated in FIG. 4, is an exemplary system 148 for processing a readback signal to obtain a thermal signal, a magnetic head-to-disk spacing signal and/or a thermal head-to-disk spacing signal. Again, the particular system used to convert the readback signal to provide the thermal signal, the magnetic head-to-disk spacing signal and/or the thermal head-to-disk spacing signal is not important for purposes of the invention.

The thermal signal may be calibrated using the magnetic signal, for example, so as to provide for a quantitative determination of head-to-disk spacing. Alternatively, the thermal signal may be calibrated using a known surface profile on the disk. As shown in FIG. 4, a readback signal is detected from the disk surface 24 by the MR element 72. It is assumed for purposes of illustration that the readback signal is a composite signal containing both magnetic and thermal signal components, it being understood that a readback signal devoid of a magnetic signal component contains a thermal signal component useful for determining head-to-disk clearance. The readback signal detected by the MR element 72 is communicated to the AE module 74 and then to a highpass filter 150. The highpass filter 150 is shown as a component external to the AE module 74, but is provided to generally represent the highpass filtering behavior of the AE module 74. The transfer function of the effective highpass filter 150 is denoted as $H_o$. The output signal from the highpass filter 150 is sampled by an analog-to-digital converter 151 to create digitized samples of the highpass filtered readback signal.

As illustrated in FIG. 4, the thermal signal, indicated at a point 159 at the output of the thermal signal extraction filter 157, may be produced using any of the several techniques are known by those skilled in the art. For example, the digitized readback signal may be communicated to an inverse filter 156 which corrects for the distortion introduced by the highpass filter 150 of the AE module 74. The transfer function of the inverse filter 156 is denoted as $H_o^{-1}$. The thermal signal 159 is then extracted by the thermal signal extraction filter 157, which may be a FIR filter. It is understood that the inverse filter 156 may be an infinite impulse response (IIR) filter to restore the thermal signal 159 distorted by the highpass filter 150. Alternatively, as denoted as 161 the readback signal may be tapped at a point prior to the highpass filter 150 and input to the thermal signal extraction filter 157, which may be a FIR filter as discussed in detail hereinabove. The thermal signal 159 extracted by the thermal signal extraction filter 157 is communicated to a mean filter 158 which, in turn, produces a thermal spacing signal 162 that is linearly related to the head-to-disk spacing. The mean filter 158 is a digital moving average filter. The thermal signal 159 may be also communicated to disk drive controller 19' for purposes of controlling the heating of the MR element 72 as discussed hereinbelow.

The readback signal provided at the output of the analog-to-digital converter 151 may also be communicated to an amplitude detector 152, such as a FIR filter, that detects the peak-to-peak amplitude of the readback signal and extracts the magnetic signal component from the readback signal. The logarithm of the magnetic signal is obtained by passing the magnetic signal through the log device 154, which produces a magnetic signal that is linearly related to the head-to-disk spacing. Having extracted both the magnetic and thermal spacing signals 160 and 162, respectively, the thermal spacing signal 162 is calibrated by disk drive controller 19' since the magnetic calibration is known and only depends on the recorded wavelength of the signal. Alternatively, the thermal spacing signal 162 may be calibrated using a known surface profile on the disk 24. Such calibration techniques are well known in the art. It is important to note that both the negative (or the inverse) of the magnetic spacing signal 160 and the thermal spacing signal 162 are linearly proportional to the head-to-disk spacing (y). The disk drive controller 19' calibrates the thermal spacing signal 162 for the purpose of controlling the heating of the MR element 72, alone or in conjunction with thermal signal 159.

The embodiment shown in FIG. 4 further includes a memory 92' coupled to the disk drive controller 19'. The memory 92', although depicted as a component separate from the disk drive controller 19', may be provided within the disk drive controller 19'. The memory 92' may be configured to include a table or array 93' within which MR heating parameters and thermal signal parameters and/or head-to-disk spacing parameters associated with each of the R/W transducers 71 may be stored. As in the previous embodiment, examples of MR heating parameters that may be stored in memory 92' include bias current or voltage to the MR element 72, write current or voltage to the thin-film write element 94, and a measure of energy to the heating element 96 such as a resistor current through a resistor. Thermal signal parameters such as thermal signal magnitude, e.g., the peak MR output voltage, for each of the MR elements 72 installed in a disk drive may or may not be stored in memory 92'. That is, thermal signal parameters are preferably stored in memory 92' only if used by the disk drive controller 19' to control the heating of the MR element 72. The head-to-disk spacing parameter is preferably based on the thermal spacing signal 162, but may be based upon the magnetic spacing signal 160 as discussed hereinbelow.

Disk drive controller 19' controls the heating of MR element 72 based on the head-to-disk spacing parameter and preferably the thermal signal parameter. For example, disk drive controller 19' monitors the head-to-disk spacing, and preferably the magnitude of thermal signal 159, for each MR element 72 as that MR element 72 flies over a predetermined area, e.g., the ID, the OD, or track, of disk 24. The head-to-disk spacing, and preferably the peak MR output voltage, is stored in memory 92', along with at least one of the MR heating parameters. One or more of the MR heating parameters is then increased in steps within a predetermined range so long as the head-to-disk spacing is greater than a minimum flyheight. That is, the step-wise increase in the MR heating parameter is ceased when the head-to-disk spacing of MR element 72 falls below the minimum flyheight, or a maxim MR heating parameter value within the predetermined range is reached. Also, the step-wise increase in the MR heating parameter may be ceased when the thermal response of MR element 72 starts to drop or has increased to a desired level. Alteratively, it may be desirable to decrease, rather than increase, one or more of the MR heating parameters. In any case, because the heating of each MR element is based upon the head-to-disk spacing, the present invention can overcome the head/disk contact problem caused when the R/W transducer expands upon heating and descends toward the surface of the disk.

Figure 4A:
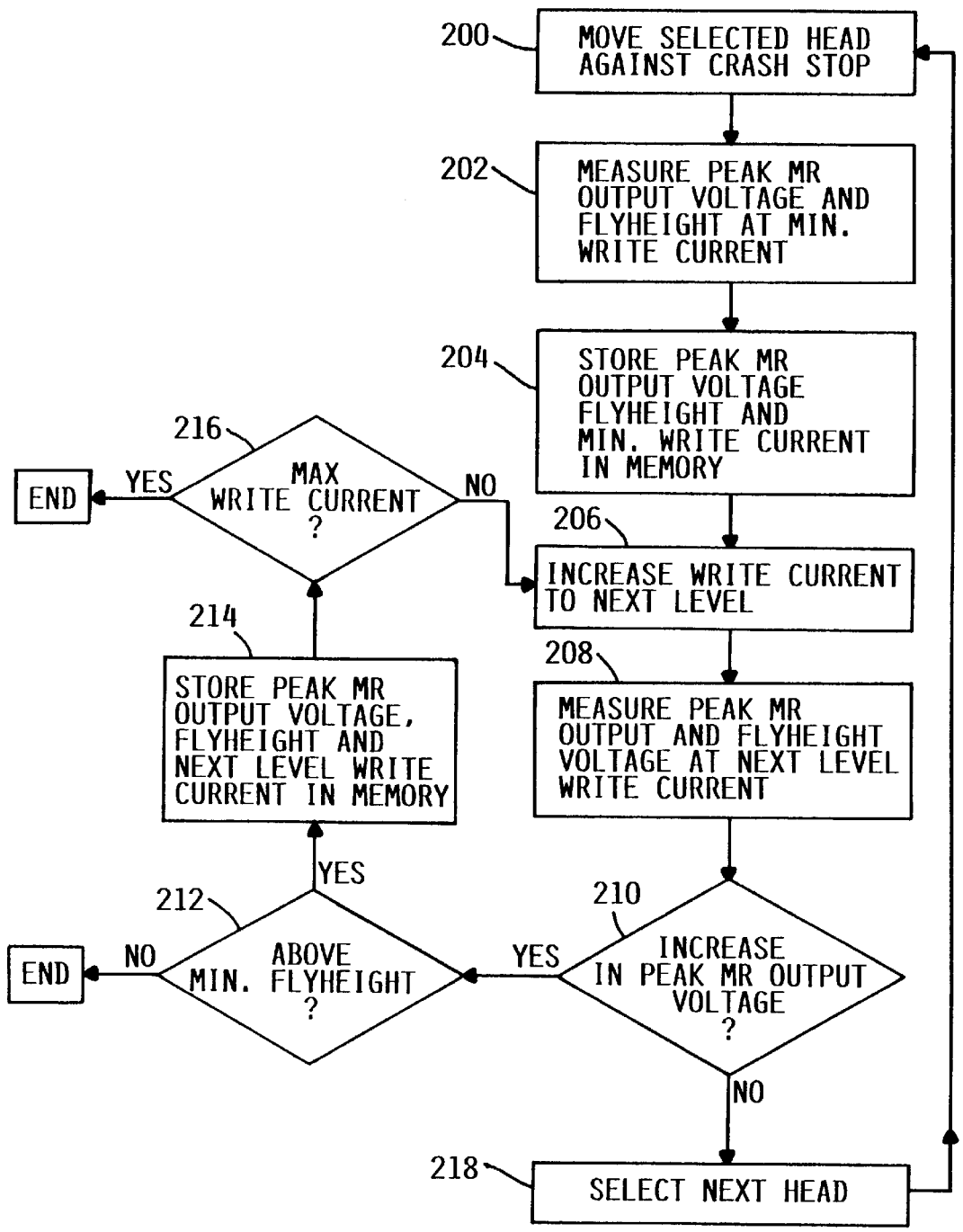
FIG. 4A is a flow chart of an embodiment of a method for improving the thermal response of an MR element according to the present invention using the apparatus shown in FIG. 4.

FIG. 4A is a flow chart of an exemplary method of using the apparatus shown in FIG. 4. In FIG. 4A, the write current is used as the MR heating parameter. However, any combination of the bias current or voltage, write current or voltage, and resistor current or voltage (or other measure of energy to the heating element 96) may be used. The method begins at step 200, with the movement of a selected MR element 72 to a predetermined area, e.g., the ID, of disk 24. As is well known in the art, this may be accomplished by servo controller 18 acting in cooperation with actuator voice coil motor 22 to move the actuator arms 11 against the ID crash stop (not shown), for example. At step 202, the disk drive controller 19' measures the peak MR output voltage (thermal signal magnitude) and head-to-disk spacing at a minimum write current within a predetermined range of write current. For example, the low end of the predetermined range may be zero, while the high end of the predetermined range may be the maximum write current that will not damage the thin-film write element 94 or the MR element 72. At step 204, the peak MR output voltage, the head-to-disk spacing, and the minimum write current are stored in the memory 92'. At step 206, the disk drive controller 19' increases the write current to a next level within the predetermined range. At step 208, the disk drive controller 19' measures the peak MR output voltage (thermal signal magnitude) and head-to-disk spacing at the next level write current. At step 210, the disk drive controller 19' determines whether the peak MR output voltage at the next level write current is larger than the peak MR output voltage in memory 92'. If the peak MR output voltage has increased, the process proceeds to step 212. At step 212, the disk drive controller 19' determines whether the head-to-disk spacing is less than the minimum flyheight. The minimum flyheight is preferably chosen so that the R/W transducer 71 is unlikely to abrade the surface of disk 24 and produce a magnetic void. However, the minimum flyheight may be chosen to be any value including zero. If the head-to-disk spacing is below the minimum flyheight, the process ends. If the peak MR output voltage has increased and the head-to-disk spacing is greater than the minimum flyheight, the peak MR voltage, the head-to-disk spacing, and the next level write current are stored in memory 92' at step 214. At step 216, the disk drive controller 19' determines whether the next level write current is the maximum write current within the predetermined range. If the next level write current is the maximum write current, the process ends. If the next write current is not the maximum write current, the process returns to step 206. If the peak MR output voltage has decreased at step 210, the next MR element 72 is selected at step 218, and the process returns to step 200. Of course, step 218 and the subsequent return to step 200 are unnecessary if the data storage system only employs one MR element 72.

Figure 4B:
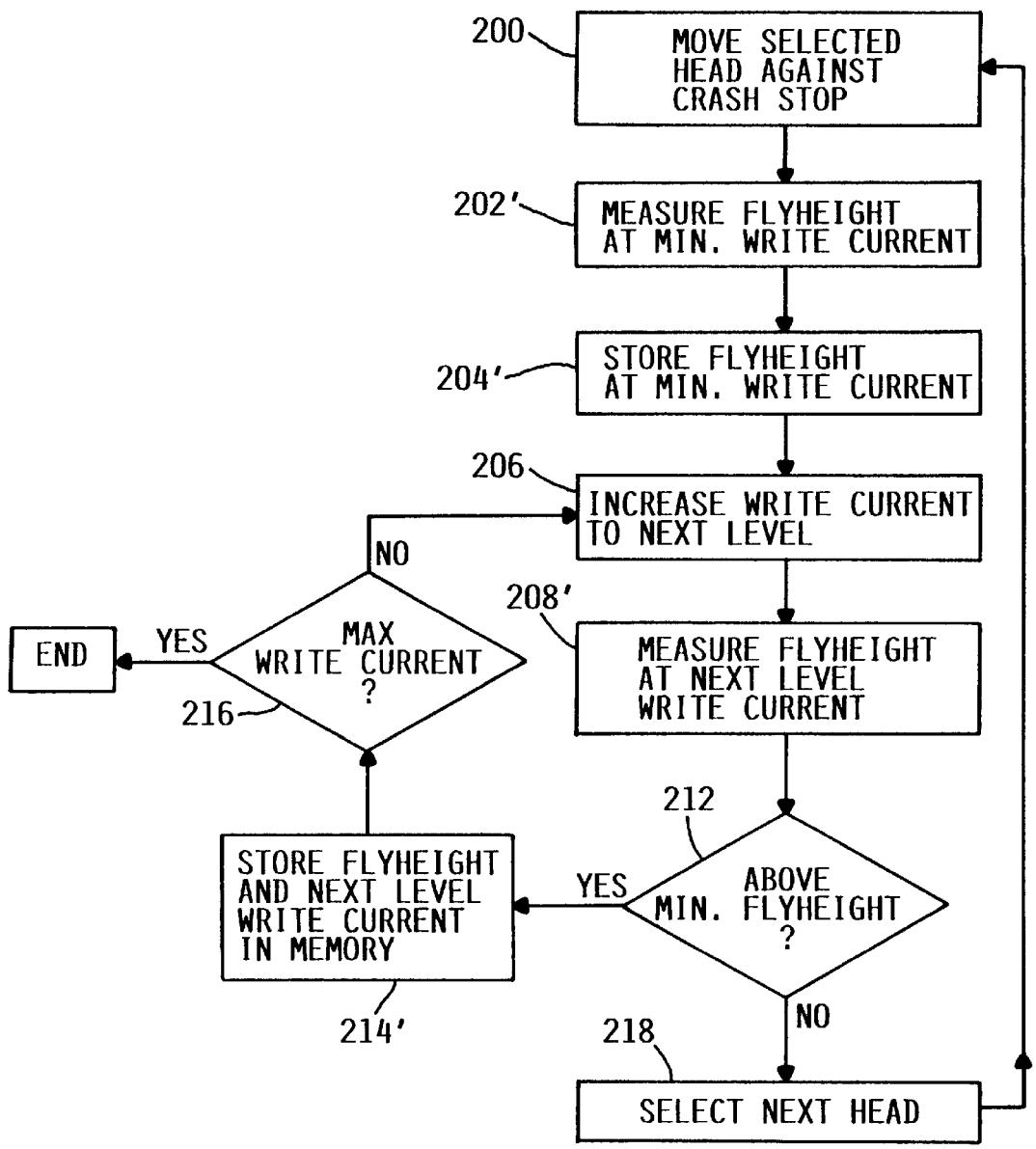
FIG. 4B is a flow chart of another embodiment of a method for improving the thermal response of an MR element according to the present invention using the apparatus shown in FIG. 4.

FIG. 4B is a flow chart of another exemplary method of using the apparatus shown in FIG. 4. The method shown in FIG. 4B is similar to the method shown in FIG. 4A, with the exception that the peak MR output voltage (thermal signal magnitude) is not used to control the heating of MR element 72. This renders step 210 unnecessary. This also modifies steps 202, 204, 208 and 214 such that the peak MR output voltage (thermal signal magnitude) need not be measured and stored in steps 202', 204', 208' and 214'. The method shown in FIG. 4B is simpler than that shown in FIG. 4A, but may not be as effective in improving the thermal response of MR element 72.

Preferably, the thermal spacing signal 162 calibrated in the disk drive controller 19' is used as the head-to-disk spacing parameter to control the heating of MR element 72. Alternatively, the magnetic spacing signal 160 (instead of thermal spacing signal 162) may be used to control the heating of MR element 72, alone or in conjunction with thermal signal 159. It is known by those skilled in the art to use a magnetic readback signal produced by a read/write transducer to determine spacing changes between the surface of a disk and the transducer. One such method for determining head-to-disk spacing using a magnetic readback signal is referred to as a Harmonic Ratio Flyheight (HRF) clearance test. The HRF test is a known method for measuring the flyheight of a slider supporting a transducer that is performed in-situ, or within the data storage system housing, using a magnetic head-to-disk spacing signal. The HRF method is described in U.S. Pat. No. 4,777,544, which is assigned to the assignee of the present invention and incorporated herein by reference. The HRF measurement method is a continuous, instantaneous measurement of the ratio of two spectral lines in the spectrum of a readback signal. Both of the instantaneous spectral line amplitudes relate to the same volume element of the recording medium directly underneath the MR element. The HRF measurement method provides for the determination of the instantaneous head clearance with respect to the disk surface using a magnetic readback signal.

In another alternative, the step-wise increase in the MR heating parameter may be ceased when the thermal signal 159 indicates that the MR element 72 is contacting the data storage disk 24. Such contact may be indicated, for example, when the number of positive (heating) or negative (cooling) peaks of the thermal signal 159 abruptly increases. In such a case, the disk drive controller 19' would reduce the MR heating parameter to the previous level. The indication of contact or near-contact may replace the head-to-disk spacing parameter in the methods shown in FIGS. 4A and 4B, for example.

Instead of, or in addition to, improving the thermal response of an MR head by controlling the heating of the MR element based on a feedback signal from the MR element as in the embodiments discussed hereinabove, the thermal response on an MR head may also be improved by reducing the heat transfer from the MR element to a shield layer. According to this embodiment, an insulation layer between the MR element and the shield layer is a material having a lower thermal conductivity than is conventional. Preferably, the insulation layer includes a material having a thermal conductivity less than or equal to 5 W/m-° C. In addition, the MR element may be dimensioned to have a smaller sectional area (i.e., shorter and/or narrower) than is conventional and/or the insulation layer may be made thicker than is conventional.

Figure 5:
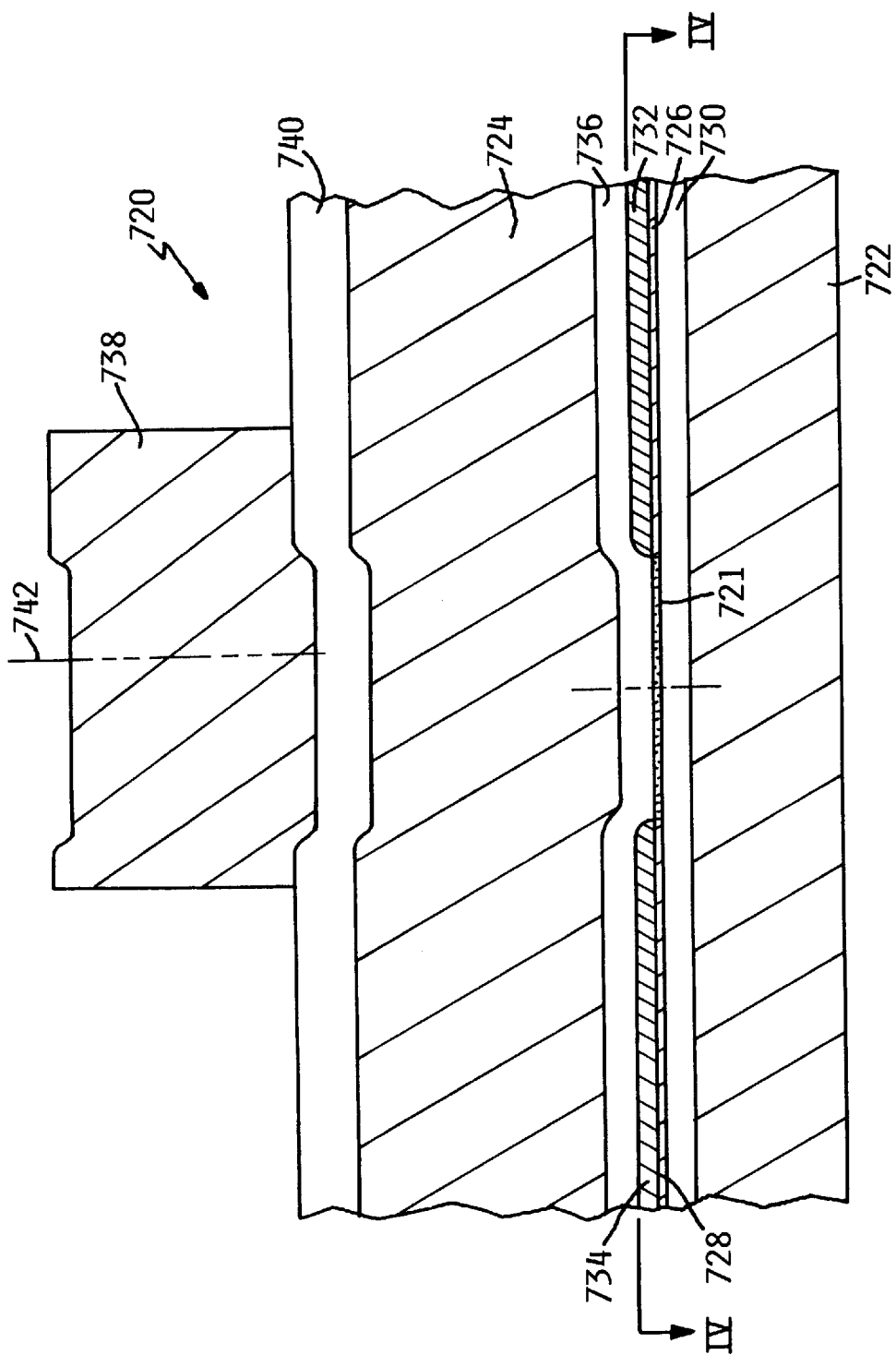
FIG. 5 is a bottom view of the active surface of an MR head, i.e., as viewed from a magnetic medium, according to an embodiment of the present invention.
Figure 6:
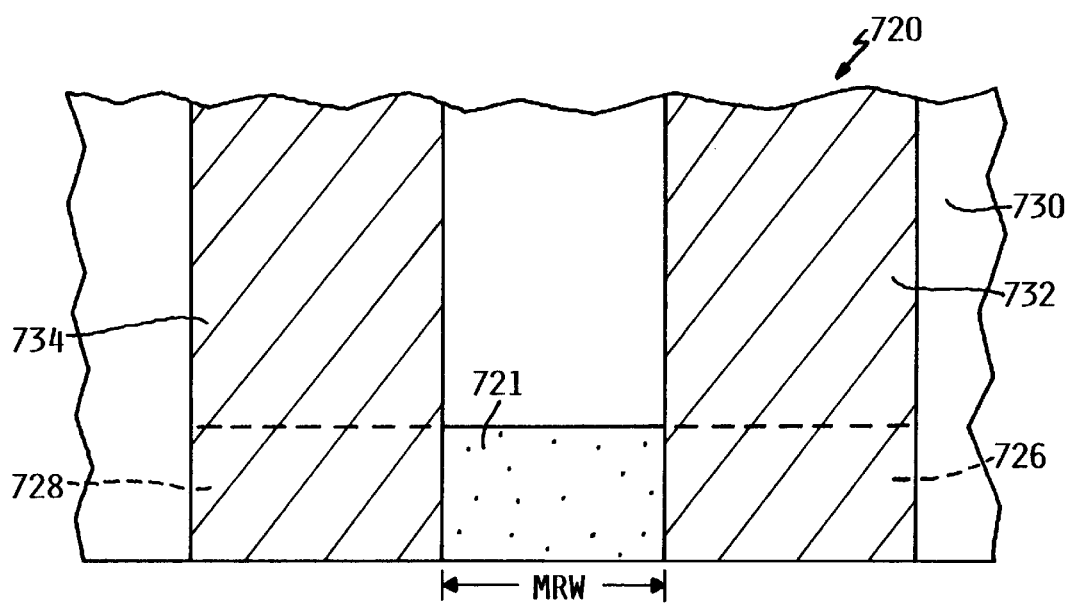
FIG. 6 is a sectional view of the MR head shown in FIG. 5.

FIG. 5 is a bottom view of the active surface of an MR head 720, i.e., as viewed from a magnetic medium, and FIG. 6 is a sectional view thereof along line VI—VI in FIG. 5. An MR element 721 is sandwiched between a magnetic shield layer 722 and a magnetic shield/write pole layer 724.

Although not shown, the MR element 721 has a tri-layered structure, i.e., a soft adjacent layer, an intermediate film deposited on the soft adjacent layer, and an MR film deposited on the intermediate film. The soft adjacent layer is made of a soft magnetic material such as PERMALLOY, CoZrMo and the like. The intermediate film is made of a nonmagnetic material such as Ti, $SiO_2$ and the like. The MR film is made of a magnetoresistive material such as NiFe. The soft adjacent layer provides transverse magnetic biasing in the MR film via a biasing current flowing longitudinally through MR element 721. Longitudinal magnetic biasing of the MR film is provided by hard bias magnet layers 726 and 728, which abut against opposite side edges of MR element 721 and are made of an electrically conductive and magnetically hard material such as a cobalt alloy, e.g., CoPtCr.

Hard bias magnet layers 726 and 728 and MR element 721 are each deposited on an insulation layer 730, which is deposited on magnetic shield layer 722. Magnetic shield layer 722 is made of a magnetically soft and physically hard material such as CoHfNb. Lead layers 732 and 734 are respectively deposited on hard bias magnet layers 726 and 728. Lead layers 732 and 734 are made of an electrically conductive material, and are electrically connected to opposite side edges of MR element 721 via hard bias magnet layers 726 and 728, respectively.

An insulation layer 736 is deposited on lead layers 732 and 734 and MR element 721, and magnetic shield/write pole layer 724 made of PERMALLOY or other suitable material is deposited thereover. A write pole layer 738 made of PERMALLOY or other suitable material is deposited over magnetic shield/write pole layer 724, with an insulation layer 740 deposited therebetween.

An important aspect of this embodiment of the invention is that the insulation layer 730 and/or the insulation layer 736 has a lower thermal conductivity than is conventional. In conventional MR heads, the insulation layer between the MR element and the shield layers is typically dense alumina (85% $Al_2O_3$) having a thermal conductivity of 27 W/m-° C. As a result of this relatively high thermal conductivity, and because the insulation layer is relatively thin and the MR element has a relatively large sectional area, about 90% of the thermal energy from the MR element goes to the shield layers instead of going to the disk. Accordingly, conventional MR heads limit the sensitivity of the MR element temperature to head-to-disk spacing changes, which in turn limits the thermal response of the MR element. This embodiment of the invention uses an insulation layer having a relatively low thermal conductivity so that less of the thermal energy from the MR stripe is transferred to the shield layers—in effect focusing a larger percentage of the thermal energy from the MR element to the disk. In addition, the MR element may be designed to have a smaller sectional area (i.e., shorter and/or narrower) than is conventional and/or the insulation layer may be made thicker than is conventional. In any case, the sensitivity of the MR element temperature to head-to-disk spacing changes is increased and, consequently, the thermal response of the MR element is improved.

Preferably, insulation layer 730 and/or insulation layer 736 includes a material having a thermal conductivity less than or equal to 5 W/m-° C. such as titania (thermal conductivity =5 W/m-° C.), barium titanate (thermal conductivity =1 W/m-° C.), recrystallized glass ceramic such as Coming Fotoceram (thermal conductivity =2 W/m-° C.) and the like. The entire insulation layer 730/736 may consist of a low thermal conductivity material, or may consist of a conventional material doped with a low thermal conductivity material. Alternatively, the low thermal conductivity material need not be included throughout the entire insulation layer 730/736. For example, a portion of the insulation layer 730/736 near the MR element may be ion-implanted with a low thermal conductivity materials.

Magnetic shield/write pole layer 724 and write pole layer 738 are magnetically coupled at a rear portion (not shown) to form a flux path of an inductive write element. A write coil (not shown) is formed through magnetic shield/write pole layer 724 and write pole layer 738. Accordingly, insulation layer 740 forms a write gap for writing information to a magnetic medium when current is applied to the write coil. The MR element 721 is used for reading information from the magnetic medium based on a so-called MR effect, wherein the MR film changes its resistance depending on its angle of magnetization.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

I claim:

1. A method for improving a thermal response of a magnetoresistive (MR) element spaced apart from a surface of a data storage disk, the method comprising the steps of:

heating the MR element;
   reading a first signal from a location on the disk surface;
   producing a thermal signal using said first signal; and
   controlling the heating of the MR element based on said thermal signal.

2. The method of claim 1, wherein said step of controlling the heating of the MR element includes the substep of increasing the heat applied to the MR element so long as said thermal signal increases in magnitude.

3. The method of claim 1, further including the step of producing a thermal spacing signal from said first signal and wherein said step, of controlling the heating of the MR element includes the substep of increasing the heat applied to the MR element so long as said thermal spacing signal indicates the flyheight of the MR element is greater than a minimum flyheight.

4. The method of claim 1, wherein said step of controlling the heating of the MR element includes the substep of reducing the heat applied to the MR element when said thermal signal indicates the MR element is contacting the data storage disk.

5. The method of claim 1, wherein said step of heating the MR element includes the substep of providing a bias current to the MR element.

6. The method of claim 1, wherein said step of heating the MR element includes the substep of providing a write current to a thin-film write element adjacent to the MR element.

7. The method of claim 1, wherein said step of heating the MR element includes the substep of providing energy to a heating element adjacent to the MR element.

8. A method for improving a thermal response of a magnetoresistive (MR) element spaced apart from a surface of a data storage disk, the method comprising the steps of:

heating the MR element;
   reading a first signal from a location on the disk surface;
   producing a thermal spacing signal using said first signal;
   producing a magnetic spacing signal using said first signal;
   controlling the heating of the MR element based on at least one of said thermal spacing signal and said magnetic spacing signal; and
   producing a thermal signal using said first signal, wherein said step of controlling the heating of the MR element includes the substep of increasing the heat applied to the MR element so long as said thermal signal increases in magnitude.

9. A method for improving a thermal response of a magnetoresistive (MR) element spaced apart from a surface of a data storage disk, the method comprising the steps of:

heating the MR element;
   reading a first signal from a location on the disk surface;
   producing a thermal spacing signal using said first signal;
   producing a magnetic spacing signal using said first signal; and
   controlling the heating of the MR element based on at least one of said thermal spacing signal and said magnetic spacing signal, wherein said step of controlling the heating of the MR element includes the substep of increasing the heat applied to the MR element so long as at least one of said thermal spacing signal and said magnetic spacing signal indicates the flyheight of the MR element is greater than a minimum flyheight.

10. An apparatus for improving a thermal response of a magnetoresistive (MR) element spaced apart from a surface of a data storage disk, comprising:

a heat source to heat the MR element;
    an arm electronics (AE) module to read a first signal from a location on the disk surface;
    a thermal signal extraction filter to produce a thermal signal using said first signal; and
    a controller to control said heat source based on said thermal signal.

11. The apparatus of claim 10, wherein said controller increases the heat applied to the MR element so long as said thermal signal increases in magnitude.

12. The apparatus of claim 10, further comprising a mean filter to produce a thermal spacing signal using said thermal signal and wherein said controller increases the heat applied to the MR element so long as said thermal signal indicates the flyheight of the MR element is greater than a minimum flyheight.

13. The apparatus of claim 10, wherein said controller reduces the heat applied to the MR element when said thermal signal indicates the MR element is contacting the data storage disk.

14. An apparatus of claim 10, wherein said heat source is a bias current supplied to the MR element.

15. The apparatus of claim 10, wherein said heat source is a thin-film write element adjacent to the MR element.

16. The apparatus of claim 10, wherein said heat source is a heating element adjacent to the MR element.

* * * * *